No. 766,974. PATENTED AUG. 9, 1904.
J. SALVESEN.
LAUNCHING WAY.
APPLICATION FILED DEC. 23, 1903.
NO MODEL.
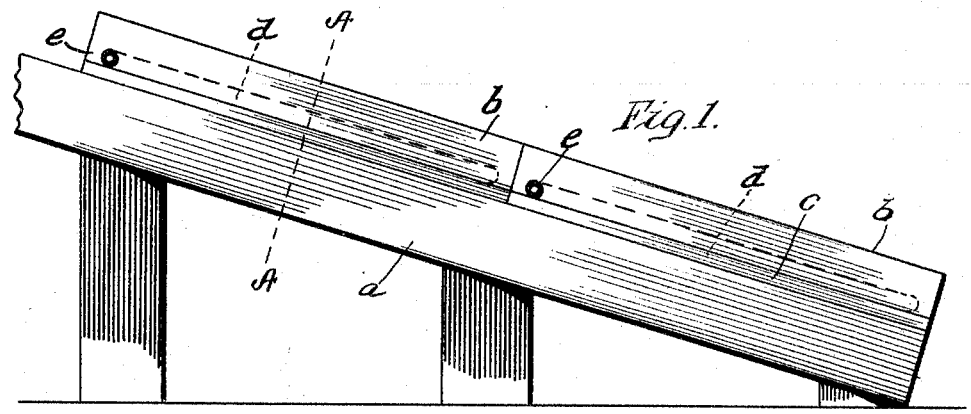
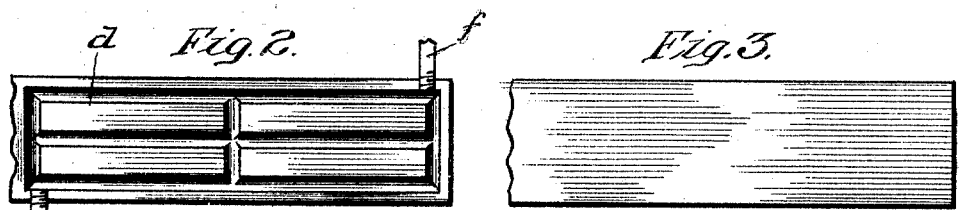
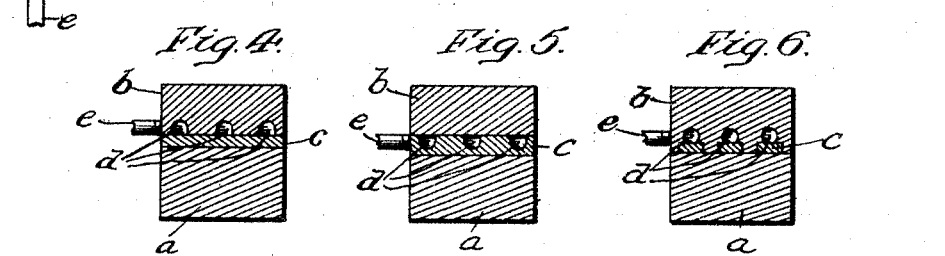
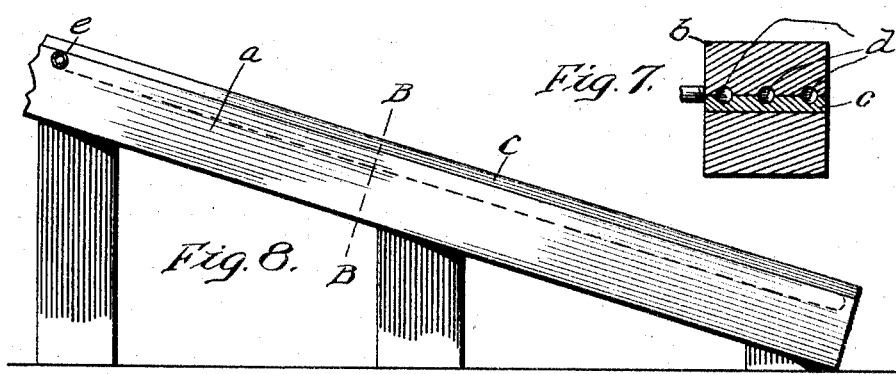
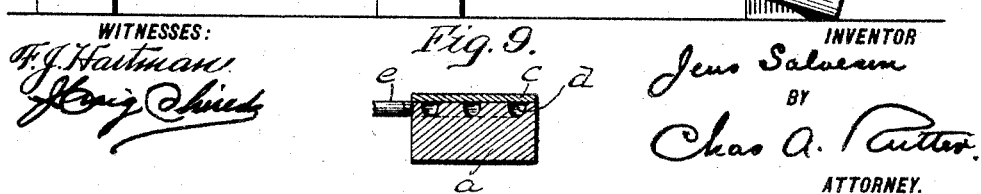
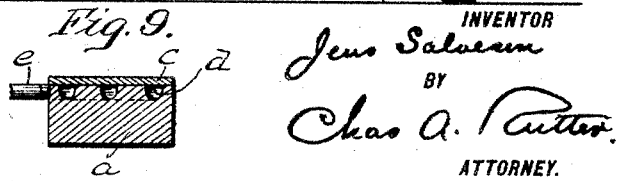

No. 766,974. Patented August 9, 1904.

UNITED STATES PATENT OFFICE.

JENS SALVESEN, OF CAMDEN, NEW JERSEY.

LAUNCHING-WAY.

SPECIFICATION forming part of Letters Patent No. 766,974, dated August 9, 1904.

Application filed December 23, 1903. Serial No. 186,265. (No model.)

*To all whom it may concern:*

Be it known that I, JENS SALVESEN, a citizen of the United States, and a resident of the city and county of Camden, State of New Jersey, have invented certain new and useful Improvements in Launching-Ways, of which the following is a specification.

My invention relates to improvements in launching-ways for vessels; and the object of my invention is to furnish a means for controlling the fluidity of the lubricant used between the stationary and sliding parts of the ways, so that it will be in the condition to give the best results when the vessel carried by the ways is launched.

The lubricant almost universally used to grease launching-ways is tallow. In cold weather this material not infrequently gets so chilled and stiff that its lubricating properties disappear, and in hot weather it sometimes melts and runs away or by the weight of the vessel upon the sliding way it is forced out between the sliding way and the stationary way to such an extent that the former refuses to slide upon the latter.

The purpose of my invention is to furnish a means whereby the lubricant may be quickly and economically heated and softened in cold weather or cooled and hardened in warm weather to a proper degree to produce the best results.

My invention is illustrated in the accompanying drawings, in which—

Figure 1 is a side elevation of part of a launching-way; Fig. 2, a bottom plan of the upper part of the sliding way; Fig. 3, a plan of part of the shoe of the sliding way; Fig. 4, a section of Fig. 1 on line A A; Figs. 5, 6, and 7, similar views of modifications of my invention; Fig. 8, a side elevation of part of a stationary way, showing a modification of my invention; Fig. 9, a section of Fig. 8 on line B B.

$a$ is part of a stationary and $b$ part of a sliding way. The ways are usually constructed of wood and are of a size proportionate to the size and weight of the vessel to be launched. Tallow is placed between the ways, and sometimes one or both of them are furnished with a shoe $c$ of harder wood than the part to which it is attached—this to save wear.

As I have before stated, the tallow sometimes gets so cold and stiff that it ceases to be a good lubricant, and at other times it becomes so heated and soft that it is pressed out between the ways.

In order to heat or cool the tallow, I construct the ways as follows: Upon the under side of the sliding way $b$ or upon the upper side of the stationary way $a$ I form a number of grooves $d$, or in some cases a single groove might suffice, and I cover the bottom or the top of the way with a shoe $c$, as shown in Figs. 1, 2, and 8. The way is furnished with a port $e$, through which heated air, steam, hot water, or other heated fluid in cold weather or cold air, cold water, brine, or other cooling fluid in hot weather can be admitted to the groove or grooves $d$. A port $f$ properly located may be employed for drawing off the spent fluid from the groove or grooves. In cold weather the heated fluid acting through the shoe $c$ will heat the lubricant until it is in proper condition, and in hot weather the cooling fluid will prevent undue melting.

In some cases it would be advantageous to form the grooves in the shoe $c$, as shown in Fig. 5, instead of in the way $b$. In others the groove could be partly formed in the way and partly in the shoe, as shown in Fig. 7. In other cases it might be found advantageous to close the bottom of the grooves with a metal plate, as shown in Fig. 6, instead of with the shoe.

I do not desire to confine myself to a grooved sliding way, as the same result could be accomplished with a substantially similar arrangement of grooves in the stationary way, or both ways could carry grooves or equivalent means for conducting the fluid used.

It is essential that the grooves be protected from the tallow by a cup or similar covering $c$ or else that they be so deep that they could not be filled with the tallow when the sliding way is placed on the stationary way, and thus prevent the entrance and circulation of the heating or cooling fluid.

Having thus described my invention, I claim as new and desire to secure by Letters Patent—

1. The combination with a launching-way of means for heating or cooling the lubricant placed between the movable and stationary members.

2. A launching-way the stationary or movable member of which is furnished with a passage or passages for the circulation of a heating or a cooling fluid.

3. In a launching-way, in combination, a stationary member and a sliding member one of which is furnished with grooves or passages for a heating or cooling fluid, and a cap-piece for closing the open sides of said grooves or passages.

JENS SALVESEN.

Witnesses:
B. TENNESON,
W. R. HUMMEL.